US008079017B2

(12) United States Patent
Qureshi et al.

(10) Patent No.: US 8,079,017 B2
(45) Date of Patent: Dec. 13, 2011

(54) AUTOMATED QS INTERFACE TESTING FRAMEWORK

(75) Inventors: Rashid Qureshi, Redmond, WA (US); Carolyn Elaine Duke, Stittsville (CA); Victor J. Major, Ottawa (CA)

(73) Assignee: Alcatel-Lucent, Paris (FR)

( * ) Notice: Subject to any disclaimer, the term of this patent is extended or adjusted under 35 U.S.C. 154(b) by 1688 days.

(21) Appl. No.: 11/288,226

(22) Filed: Nov. 29, 2005

(65) Prior Publication Data

US 2007/0124726 A1    May 31, 2007

(51) Int. Cl.
*G06F 9/44* (2006.01)
(52) U.S. Cl. .................... 717/124; 717/121; 717/126
(58) Field of Classification Search .................... None
See application file for complete search history.

(56) References Cited

U.S. PATENT DOCUMENTS

| | | | | |
|---|---|---|---|---|
| 5,577,198 A * | 11/1996 | Willrett et al. | | 714/33 |
| 5,809,108 A * | 9/1998 | Thompson et al. | | 379/10.02 |
| 5,970,120 A * | 10/1999 | Kasrai | | 379/9 |
| 6,014,424 A * | 1/2000 | Thai | | 379/15.01 |
| 6,047,389 A * | 4/2000 | Thai | | 714/38 |
| 6,260,062 B1 * | 7/2001 | Davis et al. | | 709/223 |
| 6,260,065 B1 * | 7/2001 | Leiba et al. | | 709/224 |
| 6,546,432 B2 * | 4/2003 | Couturier et al. | | 719/318 |
| 7,100,149 B1 * | 8/2006 | Venkatesan et al. | | 717/121 |
| 7,103,874 B2 * | 9/2006 | McCollum et al. | | 717/121 |
| 7,174,555 B2 * | 2/2007 | Garbanati et al. | | 719/313 |
| 7,330,722 B1 * | 2/2008 | Kirtley et al. | | 455/423 |
| 7,373,373 B2 * | 5/2008 | McElhannon | | 709/201 |
| 7,451,452 B2 * | 11/2008 | Garbanati et al. | | 719/313 |
| 7,747,983 B2 * | 6/2010 | DeBruin et al. | | 717/124 |
| 2001/0052089 A1 * | 12/2001 | Gustavsson et al. | | 714/38 |
| 2003/0012183 A1 * | 1/2003 | Butler et al. | | 370/352 |
| 2003/0206544 A1 * | 11/2003 | Taylor | | 370/350 |
| 2004/0005038 A1 * | 1/2004 | Garbanati et al. | | 379/15.01 |
| 2004/0015869 A1 * | 1/2004 | Herriot et al. | | 717/126 |
| 2004/0083456 A1 * | 4/2004 | Cornett et al. | | 717/124 |
| 2005/0289517 A1 * | 12/2005 | Balfe et al. | | 717/126 |

(Continued)

FOREIGN PATENT DOCUMENTS

GB    2313457    11/1997

OTHER PUBLICATIONS

"Using Web Services in TMN environment", Chen et al., Mar. 2005, pp. 1-6, <http://delivery.acm.org/10.1145/1070000/1063522/p6-chen.pdf>.*

(Continued)

*Primary Examiner* — Thuy Dao
(74) *Attorney, Agent, or Firm* — Kramer & Amado P.C.

(57) ABSTRACT

A method is provided for verifying an Element Management System-Network Management System (EMS-NMS) interface. A pattern file is used in a test tool that can emulate an NMS for testing the respective EMS side of the EMS-NMS interface. The pattern file includes specifications on valid data which may be sent to or received from the EMS, such as valid data ranges, allowed actions on specific devices, and valid data values for objects for various software releases. The pattern file can be created based on the design interface specifications for new EMS and NMS software releases, which provides a significant benefit because it allows interface verification to be decoupled from EMS and NMS verification, which can greatly shorten the verification cycle of new EMS/NMS software releases.

7 Claims, 2 Drawing Sheets

U.S. PATENT DOCUMENTS

2006/0037002 A1* 2/2006 Vinberg et al. ............... 717/124
2006/0101408 A1* 5/2006 Kotamarthi et al. .......... 717/126
2008/0301643 A1* 12/2008 Appleton et al. ............. 717/124

OTHER PUBLICATIONS

"An open system architecture for operation support system at telecommunications service providers", Sakurai et al., Sep. 2003, pp. 524-529, <http://delivery.acm.org/10.1145/970000/963705/p524-sakurai.pdf>.*

International Telecommunication Union, "A CORBA interface specification for Broadband Passive Optical Networks based on UML interface requirements", Jul. 2003, XP002425604.

* cited by examiner

Node parameters

PID 8 STATUS = 3 | 5 | 6 | 7 | 8 | 9 | 13

PID 19 full_name = .*

PID 935 supports_atm = 1

PID 1271 def_adsl_line_prof_no RANGE = 1..40

Shelf parameters

PID 1274 status = 1 | 2 | 3

PID 1275 rack_no = 1 | 2 | 3 | 4 | 5 | 6

FIG. 2

AUTOMATED QS INTERFACE TESTING FRAMEWORK

FIELD OF THE INVENTION

The invention relates to verification of the interface between client and server software, and more particularly to testing of the NMS/EMS interface during development.

BACKGROUND OF THE INVENTION

In verifying a client/server system, such as an NMS/EMS system, isolation of a discovered problem may be difficult. It may be far from clear whether the problem arose in the client software, the server software, the interface between them, or some combination of client, server, and interface. This is particularly true in complex systems such as Alcatel 5620™ (NMS) and Alcatel AWS™ (EMS) systems. Most of the feature testing and automated testing of the 5620/AWS system are at the system level. The system should have all the features incorporated before the automated feature level testing can be used.

The interface between the NMS and EMS is well defined. When new features are added, the interface is updated as the NMS development team specifies new interactions necessary between the NMS and the EMS to support the feature. However, at the end of the development cycle and during feature testing, if a complex behavior fails it becomes difficult to understand whether the problem arose due to bad logic on the client side or on the server side, or whether the problem was due to a bad interface specification.

One common method of automated testing is to record a set of interactions with the system and then use the recorded data to repeat the test again and verify the responses based on the recorded data. Although simple, this approach has disadvantages. If the system behavior changes, such as by adding a new feature, there is no recorded data with which to compare new test results. Only once a feature is fully implemented can data be captured for a scenario for use in testing the scenario. This also requires a knowledgeable individual to manually verify the captured data for the new feature.

Another method is functional decomposition. Key functional aspects of the system are identified and scripts are written to activate those areas. A test harness is written which performs a set of actions by invoking APIs of the interface. The test harness must encode all the data values that a function can return and compare the response received against the encoded data set. However, creating such a test harness requires a significant amount of work, and the test harness is also tightly coupled with the environment in which the EMS system will be operated. For example, if CORBA is used as the interface, the EMS and the test harness must use the same ORB provider, and if the EMS uses any special customization or non-standard feature of a particular ORB then these issues need to be resolved before the test harness can be executed.

A simple method of testing the interface directly using only the client or the server in isolation would allow problems with the interface to be detected early in the system development cycle. Such a method should also only require loose coupling between the test environment and the EMS, such as by not linking with the EMS environment at run time. Once the interface is known to be working correctly, system level testing can focus on the logic within the client or server. This in turn would shorten the software development cycle.

SUMMARY OF THE INVENTION

In accordance with one aspect of the invention, a method is provided for testing an NMS-EMS interface of an Element Management System (EMS). For each of at least one parameter, an associated regular expression is stored, the regular expression being of at least one valid value of the parameter. The EMS is prompted to respond with an actual value of each parameter. The EMS responds with the actual value of each parameter. The actual value of each parameter is compared with the associated regular expression. The results of such comparison are presented.

In accordance with another aspect of the invention, a test tool for use in testing an NMS-EMS interface of an EMS is provided. The test tool includes a user interface. The test tool includes means to receive a message from the EMS, the message including an actual value of a parameter. The test tool includes means to compare the actual value of the parameter with a regular expression defining at least one valid value of the parameter. The test tool includes means to present the result of the comparison through the user interface.

In accordance with another aspect of the invention, a system for testing an NMS-EMS interface of an EMS is provided. The system includes an EMS, a test tool, and at least one pattern file, each pattern file including at least one regular expression of valid parameter values. The test tool includes a user interface, means for receiving at least one actual parameter value from the EMS, means for reading the at least one pattern file, means for comparing the at least one actual parameter value with one of the at least one regular expression of valid parameter values, and means for presenting the result of such comparison.

Apparatus are provided for carrying out the methods of the invention. The methods may be stored as instructions on computer-readable media.

The methods and apparatus of the present invention allow for simple testing of the EMS interface without requiring full development of both the EMS and the NMS. Use of text files and regular expressions to store valid parameter values decouples the test environment from the EMS environment, and the test designer need not worry about the specific technology used for the interface. This is in turn allows valid parameters to be specified easily for new parameters. New parameters and their associated valid values can be easily added to one or more pattern files. Valid values of an existing parameter can be easily changed, for example by adding a value to a list of values.

BRIEF DESCRIPTION OF THE DRAWINGS

The features and advantages of the invention will become more apparent from the following detailed description of the preferred embodiment(s) with reference to the attached figures, wherein:

FIG. 2 is a diagram of an example pattern file.

Figure 1:
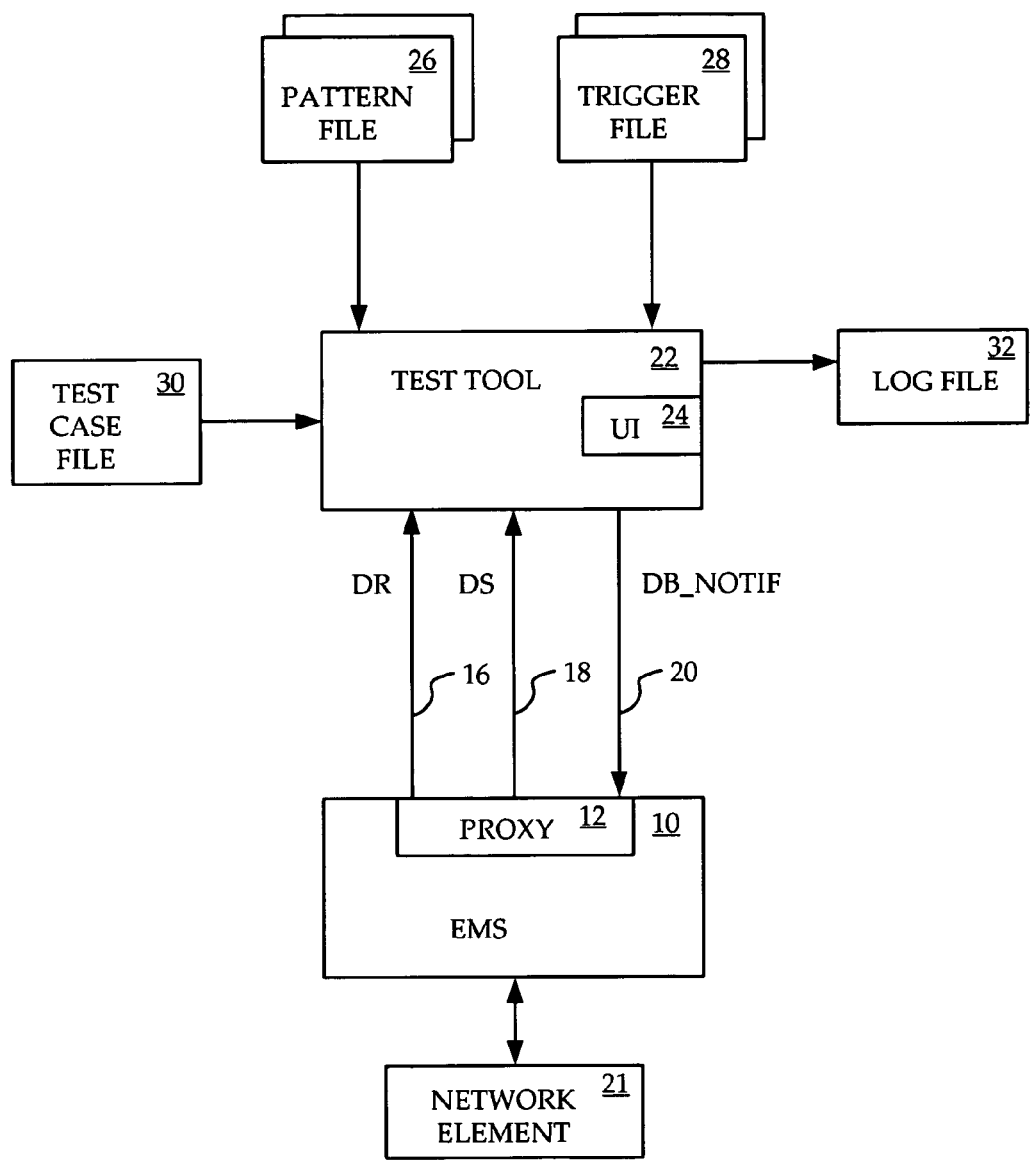
FIG. 1 is a diagram of components of the automated testing framework of the invention according to one embodiment of the invention.

It will be noted that in the attached figures, like features bear similar labels.

DETAILED DESCRIPTION OF THE EMBODIMENTS

Referring to FIG. 1, a diagram of components of an automated testing framework according to one embodiment of the invention is shown. An Element Management. System (EMS) 10 includes a proxy 12, whose interface is to be tested. The proxy 12 is a standard EMS proxy, capable of sending Data Reload (DR) messages over a DR channel 16 to a Network Management System (NMS), sending Data Sync (DS) messages over a DS channel 18 to an NMS, and receiving Database Notification (DB_Notif) messages from an NMS over a DB_Notif channel 20. The EMS 10 communicates with a network element 21. The network element 21 may be a live network element or a simulated network element. The EMS 10 manages the network element 21 at element management layer using a network management protocol such as SNMP.

A test tool 22 provides testing logic for testing the interface. The test tool 22 is capable of receiving DR messages and DS messages from the proxy 12, and of sending DB_Notif messages to the proxy 12. The test tool 22 includes a user interface 24 through which a user can receive test results from the test tool 22 and provide instructions to the test tool 22. The logic of the test tool 22 is preferably in the form of software instructions, which may be stored on a computer-readable storage medium. Alternatively, the test tool 22 may be in the form of hardware, such as a processor or integrated circuit, or in any combination of software and hardware.

The test tool 22 has access to and can read at least one pattern file 26. Each pattern file 26 is stored either in memory accessible by the test tool 22, or on a computer-readable storage medium. Each pattern file 26 includes a list of at least one parameter and a list of regular expressions, each parameter having an associated regular expression. Each regular expression is a formatted text string presenting at least one permitted value of the associated parameter. Referring to FIG. 2, an example pattern file is shown. In the example pattern file, comments are indicated by a line starting with the character '#'. The pattern file lists a number of parameters, each in a separate line. Each line includes the term "PID" (parameter identification), an identification number of the parameter, a name of the parameter, an equal sign, and a regular expression associated with the parameter. Some examples of regular expressions are: "3|5|6|7|8|9|13", indicating a series of possible valid values; ".*", indicating a text string; "1", indicating a unique value; and "1 . . . 40", indicating a range of permitted values. The term "RANGE" is located before the equal sign for PID 1271 to indicate that the regular expression indicates a range of permitted values. Other formats of pattern files may be used, as long each listed parameter can be associated with a regular expression defining valid values of the parameter. Any parameter and its associated regular expression may be located in more than one pattern file 26.

The test tool 22 has access to at least one trigger file 28. Each trigger file 28 is stored either in memory accessible by the test tool 22, or on a computer-readable storage medium. Each trigger file 28 has a similar structure and format as a DB_Notif message generated by a Network Management System (NMS).

The test tool 22 has access to a test case file 30, which can be read by the test tool 22 from memory or from a computer-readable storage medium. The test case file 30 is preferably a plain text file which is created by the user. The test case file 30 includes at least one test case. Each test case includes a name of the test case, required equipment configuration, a type of channel being tested (DS or DR), and the name of a pattern file 26. If the type of channel being tested in a test case is the DS channel 18, the test case includes the name of a trigger file 28. If the type of channel being tested in a test case is the DR channel 16, the test case includes a set of at least one action to be performed manually by the user.

In operation, the test tool 22 establishes DS, DR, and DB_Notif sessions with the EMS 10. The test tool 22 accesses and reads the test case file 30. The test tool 22 then performs a test for each test case in the test case file 30. For each test case, the test tool 22 presents the required equipment configuration to the user so that the user can verify that the EMS is configured properly for the test case. If the type of channel being tested is the DS channel 18, the test tool 22 retrieves the trigger file 28 specified in the test case and transmits the contents of the trigger file 28 to the proxy 12 as at least one DB_Notif message. The EMS performs actions specified by the at least one DB_Notif message, which may include changing or querying the values of one or more objects on the network element. After performing the actions specified by the at least one DB_Notif message, the EMS generates at least one DS message and sends the at least one DS message back to the test tool 22 over the DS channel 18. The test tool 22 receives the at least one DS message, and extracts actual parameter values from the at least one DS message. For each actual parameter value, the test tool 22 compares the actual parameter value with the respective regular expression located in the pattern file specified in the test case. The test tool 22 presents the results of the comparison to the user through the user interface 24. The test tool 22 also generates or updates one or more log files 32. If the test case fails, the log file or log files 32 can be examined to determine the exact reason for the failure. This can assist the user in reporting problems and in correcting the problems later.

If the type of channel being tested is the DR channel 16, the test tool 22 informs the user of the at least one action to be performed or emulated on the EMS 10 by the user. For example, the user can be asked to add a new network element and to begin supervision of the network element by the EMS. In response to the at least one action, the EMS 10 generates at least one DR message and transmits the at least one DR message to the test tool 22. The test tool 22 receives the at least one DR message, and extracts actual parameter values from the least one DR message. For each actual parameter value, the test tool 22 compares the actual parameter value with the respective regular expression located in the pattern file specified in the test case to determine whether the actual parameter value is a valid value. The test tool 22 presents the results of the comparison to the user through the user interface 24.

The embodiments presented are exemplary only and persons skilled in the art would appreciate that variations to the embodiments described above may be made without departing from the spirit of the invention. The scope of the invention is solely defined by the appended claims.

We claim:

1. A method executed by a processing unit (CPU) for testing an NMS-EMS interface of an Element Management System (EMS), comprising:
   for each of at least one parameter, storing an associated regular expression of at least one valid value of the parameter in a pattern file, said regular expression subject to subsequent modification by a user and the pattern file being a plain text file;
   receiving, through a user interface, a user action that is performed on the EMS;
   prompting the EMS to respond to the user action with an actual value of each parameter, wherein modifying the at least one parameter or the associated regular expression does not cause the prompting of the EMS;
   generating, by the EMS, a Data Reload (DR) message containing the actual value of each parameter;
   transmitting, by the EMS to a test tool emulating a network management system (NMS), said DR message containing the actual value of each parameter;
   comparing, by said test tool, the actual value of each parameter with the associated regular expression; and presenting, by a user interface in said test tool, results of comparing the actual value of each parameter with the associated regular expression.

2. The method of claim 1, wherein said prompting step comprises presenting a series of at least one action to be performed by a user, and wherein said transmitting step comprises transmitting the actual value of each parameter as part of a Data Reload (DR) message.

3. A test tool stored in a non-transitory computer-readable medium for emulating a network management system (NMS) in testing an NMS-EMS interface of an element management system (EMS), comprising:
- a user interface that receives a user action to perform on the EMS;
- receiving means to receive a first message from the element management system, the message including an actual value of a parameter;
- comparing means to compare the actual value of the parameter with a regular expression defining at least one valid value of the parameter, wherein said regular expression is subject to subsequent modification by a user;
- reading means to read a pattern file, said pattern file being a plain text file including said regular expression subject to modification by a user, wherein modifying the regular expression does not cause the test tool to receive a second message from the EMS; and
- presenting means to present the result of the comparison.

4. The test tool of claim 3 further comprising:
- means to read a trigger file; and
- generating means to generate at least one Database Notification (DB_Notif) message from the trigger file, and wherein the receiving means comprise means to receive a Data Sync (DS) message.

5. The test tool of claim 4 further comprising:
- means to read a test case file; and
- means to present through a user interface at least one action to be carried out by a user, wherein the receiving means further comprise means to receive a Data Reload (DR) message.

6. The test tool of claim 3 further comprising:
- means to read a test case file; and
- means to present through the user interface at least one action to be carried out by a user, wherein the receiving means comprise means to receive a Data Reload (DR) message.

7. A system stored in a non-transitory computer-readable medium for testing an NMS-EMS interface of an Element Management System (EMS), comprising:
- an EMS;
- at least one pattern file, each pattern file including at least one regular expression of valid parameter values, wherein modifying the at least one parameter does not trigger a test tool to read the at least one pattern file; and
- the test tool to emulate a network management system (NMS) comprising:
  - a user interface that receives a user action to perform on the EMS;
  - receiving means for receiving at least one actual parameter value from the EMS;
  - reading means for reading the at least one pattern file, said pattern file subject to subsequent modification by a user;
  - comparing means for comparing the at least one actual parameter value with one of the at least one regular expression of valid parameter values; and
  - presenting means for presenting the results of the comparison of the at least one actual parameter value with one of the at least one regular expression of valid parameter values.

* * * * *